(12) United States Patent
Wilson

(10) Patent No.: US 8,672,250 B2
(45) Date of Patent: Mar. 18, 2014

(54) HAND HELD MASHER DEVICE

(76) Inventor: Ian Geoffrey Wilson, Cheltenham (AU)

( * ) Notice: Subject to any disclaimer, the term of this patent is extended or adjusted under 35 U.S.C. 154(b) by 0 days.

(21) Appl. No.: 13/575,223

(22) PCT Filed: Nov. 29, 2011

(86) PCT No.: PCT/AU2011/001547
§ 371 (c)(1),
(2), (4) Date: Oct. 10, 2012

(87) PCT Pub. No.: WO2012/071608
PCT Pub. Date: Jun. 7, 2012

(65) Prior Publication Data
US 2013/0200185 A1 Aug. 8, 2013

(30) Foreign Application Priority Data
Nov. 29, 2010 (AU) ................................ 2010246489

(51) Int. Cl.
*A47J 43/044* (2006.01)
(52) U.S. Cl.
USPC ..................................... 241/169.1; 241/169.2
(58) Field of Classification Search
USPC ........................................... 241/169.2, 169.1
See application file for complete search history.

(56) References Cited

FOREIGN PATENT DOCUMENTS

| CN | 201578105 U | 9/2010 |
|---|---|---|
| EP | 2 153 885 A1 | 2/2010 |
| GB | 2 456 538 A | 7/2009 |
| WO | 2006/015403 A1 | 2/2006 |

OTHER PUBLICATIONS

International Search Report dated Apr. 5, 2012 for Application No. PCT/AU2011/001547.
Espacenet English abstract of CN 201578105 U dated Sep. 23, 2013.

*Primary Examiner* — Mark Rosenbaum
(74) *Attorney, Agent, or Firm* — Ladas & Parry LLP

(57) ABSTRACT

A hand-held masher device for mashing of potatoes and like food stuffs; said device including a power unit providing a rotating shaft output; said device further including a masher assembly extending from said power unit; said masher assembly including a skirt element and a mashing element operating within said skirt element; characterized in that mashed potato and like food stuff is extruded through apertures disposed in a side wall of said skirt element; said masher assembly including internal guide surfaces; said guide surfaces in the form of an inverted portion of a conical structure depending from an underside of a supporting annular conical wall of said skirt element, and wherein upper portions of blades of said mashing element conform to said guide surfaces.

19 Claims, 5 Drawing Sheets

HAND HELD MASHER DEVICE

The present invention relates to kitchen appliances and, more particularly, to powered devices for the preparation of food stuffs.

BACKGROUND

In order to make mashed potato, the potato is first cooked as evenly as possible. If the starch grains in the potato are ruptured, they release Amilose, imparting a 'gluey' texture. Amilose is the thickening medium in gravy and custard. These starch grains can be ruptured by either excessive heat or kinetic energy.

Best results are obtained by slicing the potato before boiling. Thick lumps overcook on the outside and release Amilose before the centre is softened. For perfect mash, the cooked potatoes should be washed before being mashed.

Once softened the potato is crushed to remove lumps then blended with milk, butter, herbs etc to taste. Mashed potato is eaten in most countries under various guises.

High speed choppers and food processors break down the starch grains and do not produce an acceptable result. They use high speed as a means of 'catching' the suspended lumps and breaking them up.

The problem with a traditional hand masher in a saucepan is that hard lumps keep moving out of the way of the crushing bars. Unless the potato or the like is perfectly cooked it can become very difficult to remove all lumps.

Commercial mashers, (or ricers as they are commonly called), use either a blade or a plunger to force material through a sieve. They have the limitation of being large and difficult to clean, and often difficult to use.

At least one powered masher for domestic use is known. This device, marketed under the brand name Kenwood®, comprises an attachment for a "stick mixer" and includes a cylindrical skirt open at the underside and a top with apertures. A blade rotates in the skirt and forces food particle up through the apertures. Problems with this arrangement are firstly, it takes considerable force to repeatedly push the device into the food stuff to be mashed as the blade appears to push the food down against the bottom of the container and, secondly, food stuff extruded through the apertures in the top of the skirt tend to adhere thereon so that repeated impacting or scraping is required.

A further problem of this masher is that to remove the blade for cleaning, the masher assembly must be attached to the power unit. The blade is attached to its drive shaft by means of a screwing "bayonet" fitting and it requires, the torque of the reduction gearing of the power unit to counteract the unscrewing force which must be applied.

In the case of the masher appliance above, the blade speed is relatively low so that an inadvertent switching on of the power unit while attempting to remove the blade is unlikely to cause injury. However, other stick mixers operate at high revolutions in which the risk of injury is high and in these mixers the blades are not removable from the drive shaft for safety reasons. This makes the blades and the insides of the skirts in which they operate difficult to clean.

It is an object of the present invention to address or at least ameliorate some of the above disadvantages.
Notes
1. The term "comprising" (and grammatical variations thereof) is used in this specification in the inclusive sense of "having" or "including", and not in the exclusive sense of "consisting only of".
2. The above discussion of the prior art in the Background of the invention, is not an admission that any information discussed therein is citable prior art or part of the common general knowledge of persons skilled in the art in any country.

BRIEF DESCRIPTION OF INVENTION

Accordingly, in a first broad form of the invention, there is provided a hand-held masher device for mashing of potatoes and like food stuffs; said device including a power unit providing a rotating shaft output; said device further including a masher assembly extending from said power unit; said masher assembly including a skirt element and a mashing element operating within said skirt element; characterized in that mashed potato and like food stuff is extruded through apertures disposed in a side wall of said skirt element.

Preferably, said masher assembly is releasably attached at a lower end of said power unit.

Preferably, said power unit comprises a generally vertically oriented cylindrical body when in use; outside surfaces of said body shaped to fit the grasping hand of a user.

Preferably, a shaft of said mashing element engages with said rotating shaft of said power unit when said device is assembled for use.

Preferably, said side wall of said skirt element forms a portion of a cone; said side wall extending downwardly and outwardly from a supporting annular conical wall of a connection portion of said masher assembly; said connection portion provided with mating elements for said releasable attachment to said power unit.

Preferably, said apertures in said side wall comprise a plurality of generally rectangular elongate slots extending from proximate a lower edge of said side wall to proximate an upper edge of said side wall; said plurality of slots spaced at equal intervals around said side wall.

Preferably, said masher assembly includes internal guide surfaces; said guide surfaces in the form of an inverted portion of a conical structure; an upper edge of said conical structure proximate an inside annular junction between said side wall and said connection portion of said masher assembly.

Preferably, said conical structure is closed at a lower end by a generally planar disc.

Preferably, said mashing element includes a central boss; said boss approximating an inverted portion of a sphere; a planar upper portion of said boss approximately equal in diameter to said generally planar disc; said mashing element further comprising at least one mashing blade extending outwardly from said boss.

Preferably, said at least one mashing blade comprises three mashing blades.

Preferably, each of said mashing blades comprises an arm element extending outwardly from said central boss to a sweeping blade tip; said blade tip comprising an elongate trailing edge extending from an inside lower edge of said skirt element to proximate said inside annular junction; said trailing edge substantially coplanar with the axis of said drive shaft of said mashing element.

Preferably, a lower portion of said arm element lies in a plane defined by said lower edge of said skirt element; an upper portion of said arm element formed so as to sweep along side surfaces of said conical structure of said guide element.

Preferably, said sweeping blade tip includes a curved surface portion extending from said elongate trailing edge and merging with said arm element; said curved surface convex relative direction of rotation of said mashing element.

Preferably, said mashing element and said shaft of said mashing element are removable for cleaning from said mashing assembly.

In another broad form of the invention, there is provided a method of mashing potatoes and like food stuffs with a hand-held powered masher device; said method including the steps of:
a. lowering a mashing assembly of said hand-held masher device into precooked potatoes or other suitable food stuffs,
b. periodically lifting and re-positioning said hand-held masher device in a container of said precooked potatoes or other suitable food stuffs.

Preferably, said hand-held masher comprises a power unit and a masher assembly releasably attached to said power unit.

Preferably, said masher assembly includes an annular skirt and a mashing element rotating within said annular skirt when said masher device is in use.

Preferably, said annular skirt is provided with elongate generally rectangular slots; said slots arranged at intervals around said annular skirt.

Preferably, said mashing element includes outwardly extending arms; each of said arms including a trailing edge substantially sweeping an inner surface of said annular skirt; said arms shaped such that lower edges of said arms lie in a plane defined by a lower edge of said skirt; upper edges of said arms conforming to surfaces of a guide structure within said annular skirt, such that when said mashing element is urged into rotation by said power unit said mashing element substantially sweeps a space between internal surfaces of said skirt and said guide structure.

BRIEF DESCRIPTION OF DRAWINGS

Embodiments of the present invention will now be described with reference to the accompanying drawings wherein.

DETAILED DESCRIPTION OF PREFERRED EMBODIMENTS

First Preferred Embodiment

Figure 1:
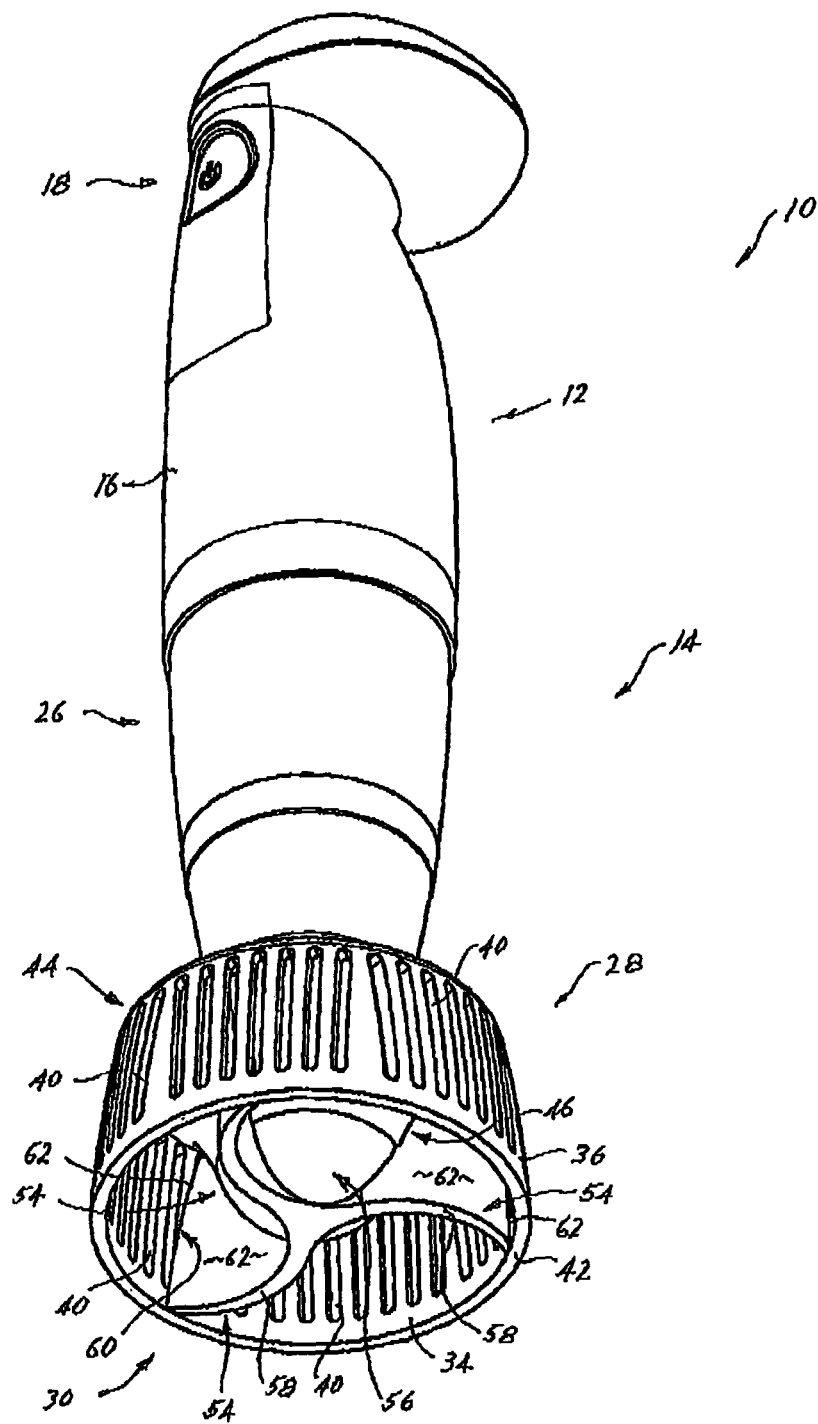
FIG. 1 is an assembled perspective view of a preferred embodiment of a hand-held masher device according to the invention.
Figure 2:
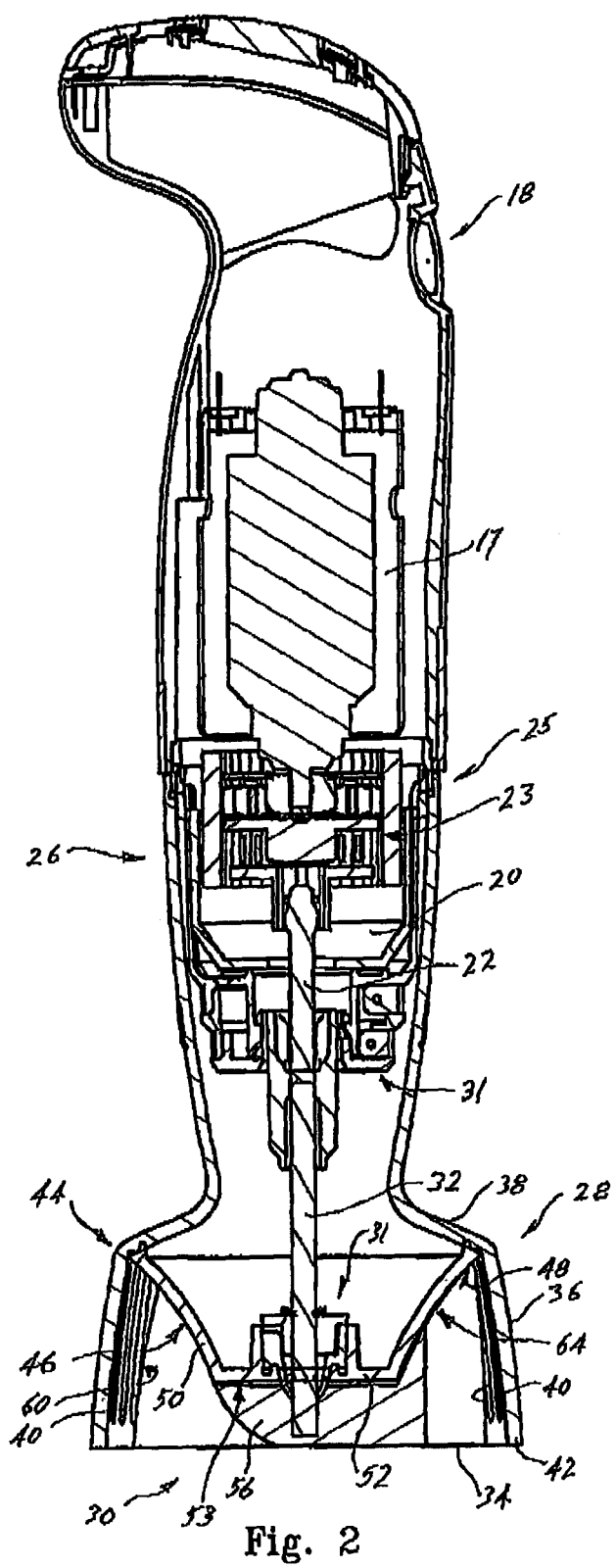
FIG. 2 is a partially sectioned view of the masher device of FIG. 1, FIGS. 3 to 5 are partially sectioned views of a further embodiment of the invention showing a shaft locking mechanism.

With reference to FIGS. 1 and 2, a preferred embodiment of a hand-held masher device 10 according to the invention, comprises a power unit 12 and a masher assembly 14, releasably attached to the power unit 12.

Power unit 12 comprises a body 16 which houses at least an electric motor 17, and one or more control switches 18 for operation of the device. The body 16 is of a generally cylindrical shape but is preferably formed with outer surface shaped to suit the grasping hand (not shown) of a user. An extension 20 of the power unit houses a drive shaft 22 driven into rotary motion by the electric motor 17 of the power unit 12.

A set of reduction gears 23 housed in the base of the power unit 12, reduces the rpm of the driven shaft 22 to a fraction of the rpm of the electric motor, thereby significantly increasing the torque output of the drive shaft 22. The low rpm, suited to the mashing operation of the device, demands a relatively low powered electric motor so that in one preferred form of the masher, the device 10 is cordless and the power unit body 16 is provided with a rechargeable battery pack in the manner described in the present applicant's earlier Australian application No. 2005270712.

Extension 20 is provided with mating structures 25, for example in the form of bayonet elements, for releasable engagement with the masher assembly 14. Masher assembly 14 comprises a connection portion 26, a skirt element 28 and a mashing element 30 located within the skirt element 28. The connection portion 26, in the form of a substantially cylindrical housing, is provided with bearings 31 and a short mashing element drive shaft 32. The mashing element 30 is rigidly connected to an outer end of the mashing element drive shaft 32. Drive shaft 32 is releasably retained within the connection portion 26, for example by spring-loaded detent balls acting on an annular groove on the drive shaft, so that the shaft 32 and mashing element 30 may be removed from the assembly 14 for cleaning.

The lower end of the drive shaft 22 of the power unit 12 is adapted to engage automatically with the upper end of the mashing element drive shaft 32 when the masher assembly 14 is assembled to the power unit 12 for use.

The skirt element 28 is in the form of a section of a cone, open at its underside 34, with a aide wall 36 sloping outwardly from a supporting annular conical wall 38 extending from the connection portion 26. Spaced at regular intervals around the side wall 38 is a plurality of apertures 40. Preferably apertures 40 are formed as elongate, generally rectangular slots 40, each slot 40 extending from proximate the lower edge 42 of the side wall 36, to proximate its upper edge 44. Although the slots shown in FIGS. 1 and 2 are preferred, tests have shown that other arrangements of patterns of apertures in the side of skirt 36 perform similarly in the efficient extrusion of the material being mashed.

The skirt element 28 is further provided with an internal guide structure 46 in the form of an inverted conical structure depending from the underside of the supporting annular conical wall 38, and with its upper edge 48 proximate an inside annular junction between the side wall 36 and the supporting annular conical wall 38 of the skirt. The side wall 50 of the guide structure 46 is preferably somewhat concave. The guide element is closed at its lower end by a generally planar disc 52, through the centre of which projects the short mashing element drive shaft 32.

A particular feature of the invention resides in the characteristics and form of the mashing element 30. In a preferred form, the mashing element 30 comprises three mashing blades 54 extending radially from a central boss 56 which is rigidly attached to the outer end of the mashing element drive shaft 32. The boss 56, is in the form of an inverted section of a sphere with an upper planar surface 53 in close proximity to the underside of the closing planar disc 52 of the guide structure 46.

Each of the mashing blades 54 comprises an arm element 58, extending outwardly from the central boss 56, to a sweeping blade tip 60. This sweeping blade tip 60 is in the form of an elongate trailing edge 62 extending upwardly from proximate an inside lower edge of the skirt element side wall 36 to proximate the inside annular junction, and is oriented generally coplanar with the axis of drive shaft 32. The sweeping blade tips 60 include a curved surface portion 62 extending from the elongate trailing edge 62 and merging with the arm elements 58, with the curved surface being convex relative the direction of rotation of the mashing element 30. The relatively small swept area of the blade arms adjacent the central boss 56, prevents material accumulating in this region and rotating with the blades. This feature, together with the curved surface portions 62 ensures that material is continually forced radially outwards to be forced up against the internal surface of the skirt 36 and extruded through the apertures 40.

A lower portion of each arm element lies in a plane defined by the lower edge of the side wall 36. The upper portions 64 of these arm elements 58 are formed so as to sweep along the side surface of the inverted portion of the guide structure 46. Thus, as the mashing element rotates within the skirt element 28, the entire space between internal surfaces of the skirt element and the guide structure 46 is swept by the mashing blades, with the elongate trailing edges 60 maintaining a minimum clearance from the inside surface of the skirt element side wall 36.

Second Preferred Embodiment

In a second preferred embodiment of the invention, a food preparation appliance again comprises a power unit as described above and a blade extension unit. A blade extension unit according to this embodiment, may take the form of the masher assembly described above but may be any assembly comprising housing with a skirt at its distal end, a drive shaft extending through the housing and a food preparation blade rotatable within the skirt.

Figure 3:
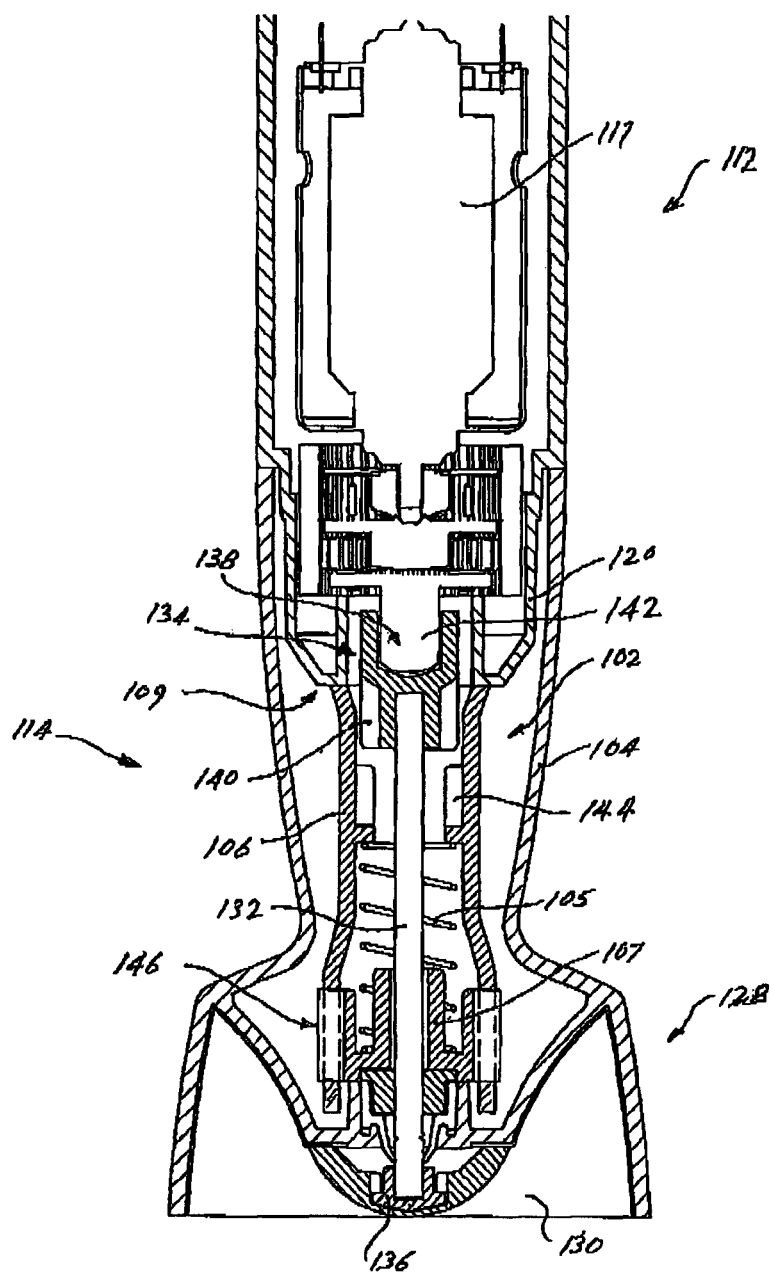
Figure 4:
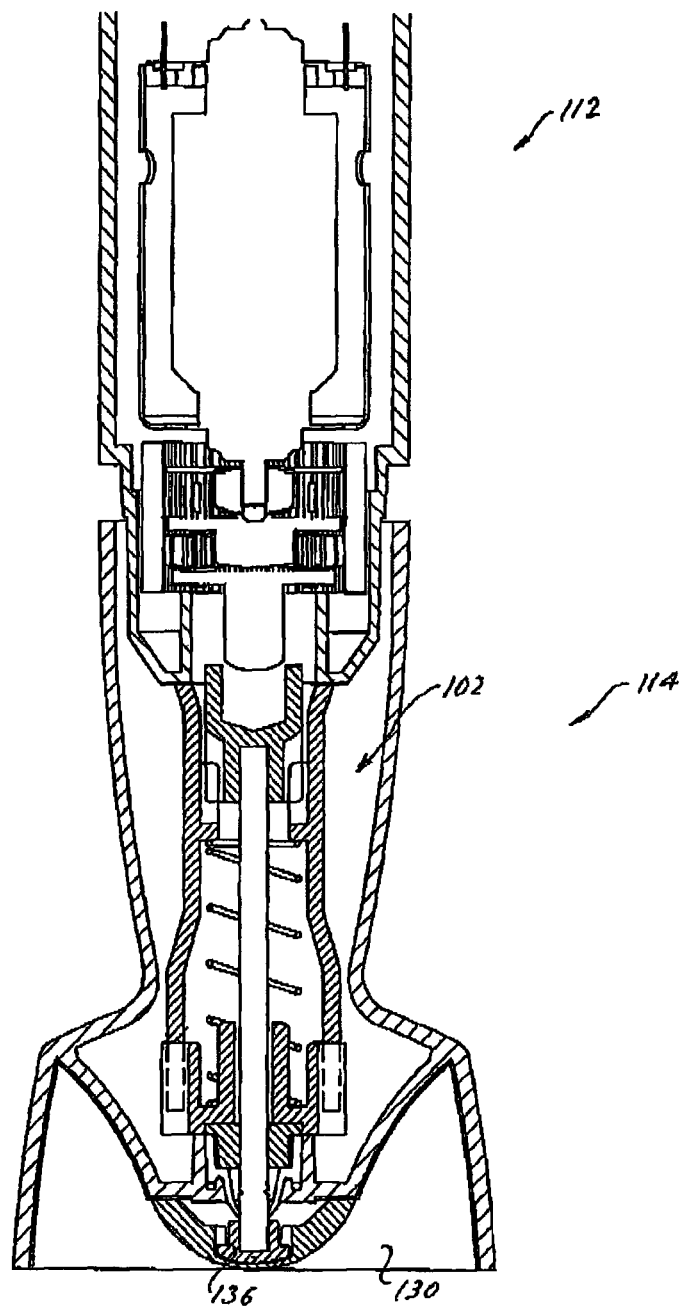

FIG. 3, shows a food preparation appliance 112 comprising a power unit 117 (lower portion shown only) engaged with a blade extension unit 114 for use. Located within housing 104 of the blade extension unit 114, is a sliding member 106, movable within the housing between a non-engaged position as shown in FIG. 3 and an engaged position as shown in FIG. 5.

Figure 5:
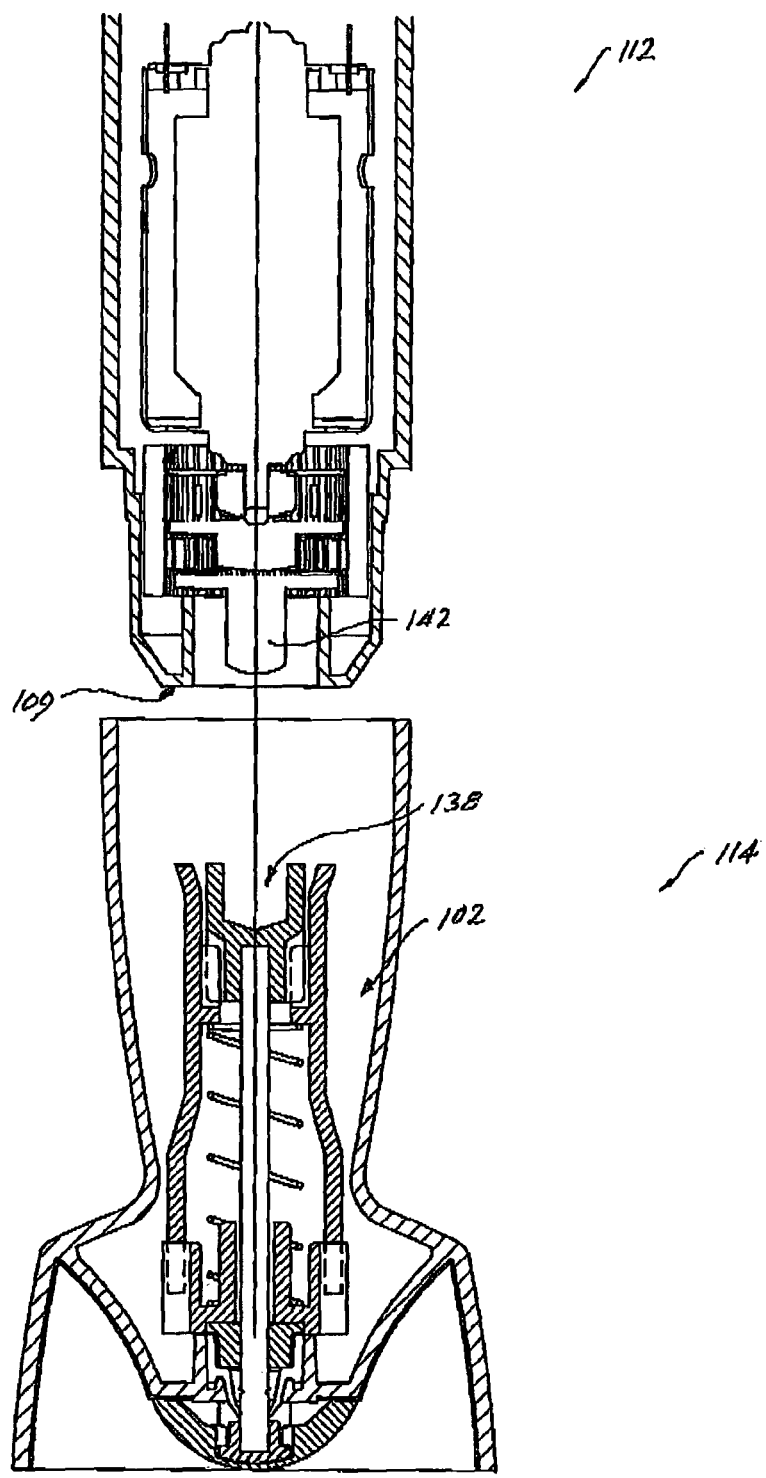

Sliding member 106 is automatically urged into the engaged position of FIG. 5 by a spring 105, acting between a support structure 107 at the lower end of the blade extension unit 114 and the sliding member 106, as the power unit 117 is withdrawn from the blade extension unit.

It can be seen from FIG. 3, that when the extension 120 of the power unit 117 is pushed into and engages with the blade extension unit 114, the lower end 109 of the power unit forces the sliding member 106 into its disengaged position.

Drive shaft 132 of the blade extension unit 114 is provided at its proximate end with a boss 134 provided on its external surfaces with engagement elements 140. Boss 134 includes a drive socket 138 for engagement with the rotating shaft output 142 of the power unit 117. These engagement elements 140 of the boss 134, engage with complementary engagement elements 144 of the eliding member 106, when the sliding member is urged into the engaged position shown in FIG. 5.

Sliding member 106 is prevented from rotation relative to the housing 104 of the blade extension unit 114, through sliding engagement with non-rotating control elements 146 of the support structure 107, fixed within the lower end of the blade extension unit.

Blade element 130 is removably attached to the drive shaft 132 of the blade extension unit 114 by a screwed connection 136, with the thread of the screwed connection selected opposite in sense to the rotation of the drive shaft 132.

By means of the locking mechanism of the invention, as soon as the power unit is removed from blade extension unit, the drive shaft is locked and prevented from rotation. This then allows the blade element 130 to be grasped and unscrewed from the shaft 132 for ease of cleaning both the blade element and the internal surfaces of the skirt 128.

In Use

The masher device of the present invention is adapted to the mashing of pre-cooked potatoes and many other foodstuffs such as bananas, vegetables and avocado for example, in a flat-bottomed container. The device is repeatedly lowered down into the food until the lower edge of the skirt element is in contact with the surface of the container. Once the mashing process is underway, the action of the blades allows the device to sink downward into the food volume with no effort required of the user. There is little or no suction of the device into the material allowing it to be readily lifted free for several re-positionings to cover the area of the base of the container.

The slowly rotating mashing element has been found to initiate a pumping, or screw compression type action in which the food is continually pushed outwardly by the trailing edges of the blades and forced out through the apertures. While the trailing edges of the blade tips sweep against the apertures, the undersides of the lower portions of the arms of the blades, scrape the bottom of the container, pulling the food stuff into the skirt and ensuring that no lumps remain.

The above describes only some embodiments of the present invention and modifications, obvious to those skilled in the art, can be made thereto without departing from the scope of the present invention.

The invention claimed is:

1. A hand-held masher device for mashing of potatoes and similar food stuffs;
    said device including a power unit providing a rotating shaft output;
    said device further including a masher assembly extending from said power unit; said masher assembly including a skirt element and a mashing element rotating within said skirt element;
    wherein mashed potato and similar food stuff is extruded through apertures disposed in a side wall of said skirt element;
    said masher assembly including internal guide surfaces;
    said guide surfaces in the form of an inverted portion of a conical structure depending from an underside of a supporting annular conical wall of said skirt element, and wherein upper portions of blades of said mashing element conform to said guide surfaces.

2. The device of claim 1 wherein said masher assembly is releasably attached at a lower end of said power unit.

3. The device of claim 2 wherein a shaft of said mashing element engages with said rotating shaft of said power unit when said device is assembled for use.

4. The device of claim 3 wherein said mashing element and said shaft of said mashing element are removable for cleaning from said mashing assembly.

5. The device of claim 1 wherein said power unit comprises a generally vertically oriented cylindrical body when in use; outside surfaces of said body shaped to fit the grasping hand of a user.

6. The device of claim 1 wherein said side wall of said skirt element forms a portion of a cone;
    said side wall extending downwardly and outwardly from said supporting annular conical wall of a connection portion of said masher assembly;
    said connection portion provided with mating elements for said releasable attachment to said power unit.

7. The device of claim 1 wherein said apertures in said side wall comprise a plurality of generally rectangular elongate slots extending from proximate a lower edge of said side wall to proximate an upper edge of said side wall;
    said plurality of slots spaced at equal intervals around said side wall;
    mashed potato and similar stuff being extruded through said apertures.

8. The device of claim 1 wherein an upper edge of said conical structure is proximate an inside annular junction between said side wall and said connection portion of said masher assembly.

9. The device of claim 8 wherein said conical structure is closed at a lower end by a generally planar disc.

10. The device of claim 9 wherein said mashing element includes a central boss;
    said boss approximating an inverted portion of a sphere;
    a planar upper portion of said boss approximately equal in diameter to said generally planar disc;
    said mashing element further comprising at least one mashing blade extending outwardly from said boss.

11. The device of claim 10 wherein said at least one mashing blade comprises three mashing blades.

12. The device of claim 10 wherein each of said mashing blades comprises an arm element extending outwardly from said central boss to a sweeping blade tip;
    said blade tip comprising an elongate trailing edge extending from an inside lower edge of said skirt element to proximate said inside annular junction;
    said trailing edge substantially coplanar with the axis of said drive shaft of said mashing element.

13. The device of claim 12 wherein a lower portion of said arm element lies in a plane defined by said lower edge of said skirt element;
    an upper portion of said arm element formed so as to sweep along side surfaces of said conical structure of said guide element.

14. The device of claim 12 wherein said sweeping blade tip includes a curved surface portion extending from said elongate trailing edge and merging with said arm element;
    said curved surface convex relative direction of rotation 20 of said mashing element.

15. A method of mashing potatoes and similar food stuffs with a hand-held powered masher device;
    said method including the steps of:
    a. lowering a mashing assembly of said hand-held masher device into precooked potatoes or other suitable food stuffs,
    b. periodically lifting and re-positioning said hand-held masher device in a container of said precooked potatoes or other suitable food stuffs, and
    wherein said food stuff is extruded through apertures in a side wall of said a skirt element of said masher;
    said masher assembly including internal guide surfaces;
    said guide surfaces in the form of an inverted portion of a conical structure depending from an underside of a supporting annular conical wall of said skirt element, and wherein upper portions of blades of said mashing element conform to said guide surfaces.

16. The method of claim 15 wherein said hand-held masher comprises a power unit and said masher assembly releasably attached to said power unit.

17. The method of claim 16 wherein said masher assembly includes an annular skirt and a mashing clement rotating within said annular skirt when said masher device is in use.

18. The method of claim 17 wherein said annular skirt is provided with elongate generally rectangular slots;
    said slots arranged at intervals around said annular skirt.

19. The method of claim 15 wherein said mashing element includes blades having outwardly extending arms;
    each of said arms including a trailing edge substantially sweeping an inner surface of said annular skirt;
    said arms shaped such that lower edges of said arms lie in a plane defined by a lower edge of said skirt;
    upper edges of said arms conforming to surfaces of a guide structure within said annular skirt,
    such that when said mashing element is urged into rotation by said power unit said mashing element substantially sweeps a space between internal surfaces of said skirt and said guide structure.

* * * * *